United States Patent
Kumar et al.

(10) Patent No.: US 8,595,457 B1
(45) Date of Patent: Nov. 26, 2013

(54) METHOD AND SYSTEM FOR REPLICATING STORED INFORMATION

(75) Inventors: Kapil Kumar, Mountain View, CA (US); Hitesh Sharma, Santa Clara, CA (US); David Grunwald, Santa Clara, CA (US)

(73) Assignee: NETAPP, Inc., Sunnyvale, CA (US)

( * ) Notice: Subject to any disclaimer, the term of this patent is extended or adjusted under 35 U.S.C. 154(b) by 854 days.

(21) Appl. No.: 12/261,315

(22) Filed: Oct. 30, 2008

(51) Int. Cl.
- G06F 12/00 (2006.01)
- G06F 13/00 (2006.01)
- G06F 13/28 (2006.01)
- G06F 5/00 (2006.01)

(52) U.S. Cl.
USPC ............... 711/165; 710/52; 710/53

(58) Field of Classification Search
USPC .......... 711/165; 707/999.204; 710/52, 53, 56, 710/107–125; 370/431
See application file for complete search history.

(56) References Cited

U.S. PATENT DOCUMENTS

| | | | |
|---|---|---|---|
| 7,401,093 B1* | 7/2008 | Hamilton et al. | 1/1 |
| 7,783,611 B1* | 8/2010 | Hamilton et al. | 707/690 |
| 2008/0059542 A1* | 3/2008 | Atluri et al. | 707/204 |

* cited by examiner

Primary Examiner — Christian P Chace
Assistant Examiner — Gary W Cygiel
(74) Attorney, Agent, or Firm — Klein, O'Neill & Singh, LLP

(57) ABSTRACT

Method and system for replicating a storage volume is provided. Information is adaptively replicated in a swap mode or a copy mode. When information is copied from a storage volume to a memory buffer, an application determines if another information transfer from the same source volume is pending. If a transfer from the same source is pending, then information is copied from the memory buffer to a stolen buffer in a copy mode. If a transfer from the same source is not pending, then instead of copying the information, the application enables a swap mode. During the swap mode, an operating system for a storage system swaps a pointer from the stolen buffer to information stored in the memory buffer. The memory buffer itself is invalidated so that no other module can access the memory buffer. Because the pointers are swapped, the application accesses information directly from the memory buffer.

27 Claims, 6 Drawing Sheets

METHOD AND SYSTEM FOR REPLICATING STORED INFORMATION

BACKGROUND

1. Technical Field

The present disclosure relates to managing storage systems.

2. Related Art

A storage system typically includes one or more storage devices where information is stored. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system typically includes a storage operating system that organizes the system. The storage operating system may implement a high-level module, for example, a file system, to logically organize information stored on storage volumes as a hierarchical structure of data containers, such as files and logical units. For example, each "on-disk" file may be implemented as set of data structures, i.e., disk blocks, configured to store information, such as the actual data for the file. These data blocks are organized within a volume block number (VBN) space that is maintained by the file system.

In order to improve reliability and to facilitate disaster recovery in the event of a failure within the storage system, it is common to replicate, some or all of the underlying data and/or the file system that organizes that data from a source storage volume associated with a primary storage system or server to one or more remote storage destinations (i.e. secondary storage).

One way to replicate a source storage volume is to create a "Snapshot" at a primary storage system and then copy data from the snapshot to another location (secondary storage), for example, a remote location. Typically, an application (may be referred to as a volume snap mirror application ("VSM")) copies data from the snapshot to the remote location. The term "Snapshot" in this context means a persistent point in time (PPT) image of an active file system that enables quick recovery of data after data has been corrupted, lost, or altered.

Typically, to replicate snapshots, the file system receives a request for information. The file system manages and controls a plurality of memory buffers. The file system assigns some of the plurality of memory buffers to the VSM. The buffers assigned to the VSM may be referred to as "stolen buffers".

The file system first moves information from a storage volume to some of the plurality of memory buffers. Information from the memory buffers is then copied to one or more stolen buffers. VSM then accesses the information from the stolen buffers so that it can be replicated. The dual copy operation (i.e. from storage volume to memory buffer and then from memory buffer to stolen buffer) can waste storage server computing resources. Continuous efforts are being made to optimize storage server resource usage.

SUMMARY

In one embodiment, an adaptive method and system is provided, which reduces copying of information from a memory buffer to a stolen buffer during an information replication operation. A request for replicating information stored at a storage volume is generated. Before information is loaded (or copied) from a storage volume to the memory buffer, an application, for example, volume snap mirror module (VSM) determines if another transfer from the same source volume is pending. If a transfer from the same source is pending, then information is copied from the memory buffer to the stolen buffer and then made available to the VSM. This is referred to as a "Copy Mode".

If a transfer from the same source is not pending, the VSM enables a Swap Mode. During the Swap Mode, information from the memory buffer is not copied to the stolen buffer; instead, a file system manager for the operating system swaps a pointer from the stolen buffer to information stored in the memory buffer. The memory buffer itself is invalidated so that no other module/entity (including the operating system) can access the memory buffer. Because the pointer is swapped, data is not copied from the memory buffer to the stolen buffers. While continuing to use the stolen buffers, VSM accesses information from the memory buffer because of the swapped pointer.

The Copy Mode and the Swap Mode, described herein, are used advantageously to provide better performance in replicating information after a snapshot is created. During the Copy Mode for pending/active requests from the same source storage volume, cached data for a first transfer request may also be used for a second transfer request. Furthermore, if the second transfer operation gets ahead of the first transfer operation, then the first transfer operation can take advantage of the second transfer operation.

The Swap Mode minimizes copying because during the Swap Mode, information is not copied from the memory buffer to the stolen buffer. Hence, storage system resources may be better utilized because the storage system computing resources are not wasted in copying information from the memory buffer to the stolen buffer.

In another embodiment, a method is provided. The method includes: (a) generating a transfer request for replicating information stored at a storage volume; (b) assigning at least one memory buffer to an application from among a plurality of memory buffers; and (c) selectively enabling a swap mode or a copy mode for replicating the information; wherein during the swap mode, the information is loaded to one of the plurality of memory buffers and then access to the information is provided to the application requesting the information replication, without copying the information to the at least one memory buffer assigned to the application; and wherein during the copy mode, the information is loaded from the storage volume to one of the plurality of memory buffers and then copied to the assigned memory buffer so that the application can access the copied information from the assigned buffer.

In yet another embodiment, a method is provided. The method includes (a) generating a transfer request for replicating information stored at a storage volume; (b) assigning at least one memory buffer from among a plurality of memory buffers; wherein an operating system assigns the at least one memory buffer to an application; (c) determining if another request to transfer information from the same storage volume is active; (d) if another request from the storage volume is not active, enabling a swap mode for transferring information stored at the storage volume; wherein during the swap mode, the information is loaded to one of the memory buffers and then access to the information is provided to the application requesting the information replication without copying the information to the at least one memory buffer assigned to the application; and (e) if another request from the storage volume is active, then enabling a copy mode for transferring information stored at the storage volume; wherein during the copy mode, the information is loaded from the storage volume to one of the plurality of memory buffers and then copied to the assigned memory buffer so that the application can access the copied information from the assigned buffer.

In yet another embodiment, a method if provided. The method includes: (a) generating a transfer request for replicating information stored at a storage volume; (b) assigning at least one memory buffer from among a plurality of memory buffers; wherein an operating system assigns the at least one memory buffer to an application; (c) determining if another request to transfer information from the same storage volume is active; (d) if another request from the storage volume is not active, enabling a swap mode for transferring information stored at the storage volume; wherein the application creates a message; enables the swap mode in the created message and passes the message to the operating system that reads the message to use the swap mode for transferring information from the storage volume; and during the swap mode, the information is loaded from the storage volume to one of the memory buffers and then access to the information is provided to the application requesting the information replication without copying the information to the buffer assigned to the application; and (e) if another request from the storage volume is active, then enabling a copy mode for transferring information stored at the storage volume; wherein during the copy mode, the information is loaded from the storage volume to one of the plurality of memory buffers and then copied to the assigned memory buffer so that the application can access the copied information from the assigned buffer.

In another embodiment, a method is provided. The method includes (a) generating a transfer request for replicating information stored at a storage volume; (b) assigning at least one memory buffer from among a plurality of memory buffers; wherein an operating system assigns the at least one memory buffer to an application; (c) determining if another request to transfer information from the same storage volume is active; (d) if another request from the storage volume is not active, enabling a swap mode for transferring information stored at the storage volume; wherein the application creates a message; enables the swap mode in the created message and passes the message to the operating system; and during the swap mode, the operating system swaps data pointers so that information stored in one of the plurality of memory buffers is accessible to the application without having to copy the information to the assigned buffer; and after the data pointers are swapped, to prevent access to the memory buffer, the operating system invalidates the memory buffer; and (e) if another request from the storage volume is active, then enabling a copy mode for transferring information stored at the storage volume; wherein during the copy mode, the information is loaded from the storage volume to one of the plurality of memory buffers and then copied to the assigned memory buffer so that the application can access the copied information from the assigned buffer.

In yet another embodiment, a computer program product, comprising a computer usable storage medium having computer readable code embodied therein for replicating information stored at a storage volume is provided. The computer readable code includes: (a) code for generating a transfer request for replicating information stored at the storage volume; (b) code for assigning at least one memory buffer from among a plurality of memory buffers; wherein an operating system assigns the at least one memory buffer to an application; (c) code for determining if another request to transfer information from the same storage volume is active; (d) if another request from the storage volume is not active, code for enabling a swap mode for transferring information stored at the storage volume; wherein during the swap mode, the information is loaded to one of the memory buffers and then access to the information is provided to the application requesting the information replication without copying the information to the at least one memory buffer assigned to the application; and (e) if another request from the storage volume is active, then code for enabling a copy mode for transferring information stored at the storage volume; wherein during the copy mode, the information is loaded from the storage volume to one of the plurality of memory buffers and then copied to the assigned memory buffer so that the application can access the copied information from the assigned buffer.

In yet another embodiment, a system is provided. The system includes a storage system that receives a transfer request for replicating information stored at a storage volume; and an application that (a) requests at least one memory buffer from among a plurality of memory buffers; wherein the application sends the request to an operating system of a storage system and the at least one memory buffer is assigned to the application; (b) enables a swap mode for transferring information stored at the storage volume, if another request from the storage volume is not active; wherein during the swap mode, the information is loaded to one of the memory buffers and then access to the information is provided to the application requesting the information replication without copying the information to the at least one memory buffer assigned to the application; and (c) enables a copy mode for transferring information stored at the storage volume, if another request from the storage volume is active; wherein during the copy mode, the information is loaded from the storage volume to one of the plurality of memory buffers and then copied to the assigned memory buffer so that the application can access the copied information from the assigned buffer.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Figure 1:
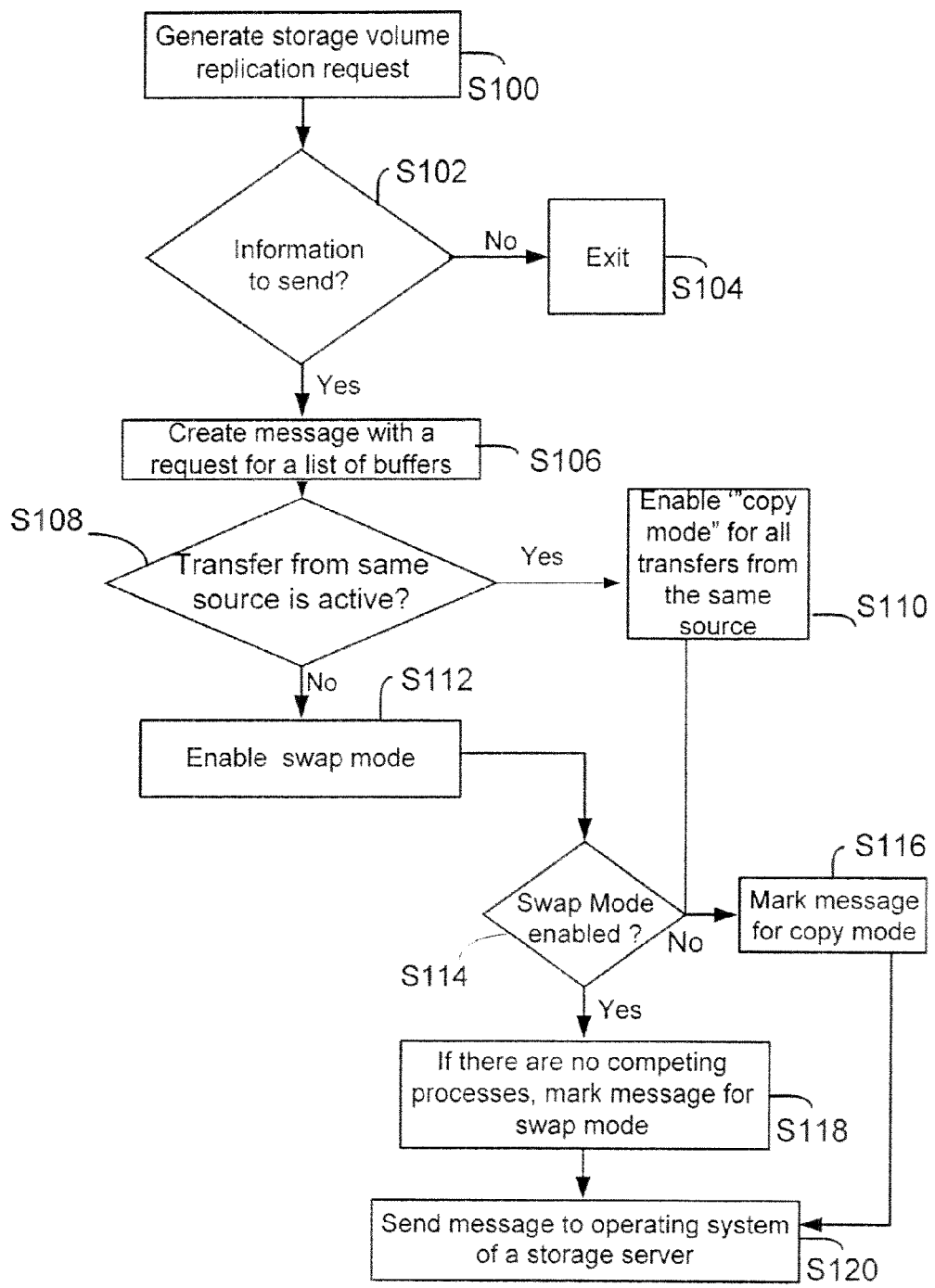
FIG. 1 shows a process flow diagram for adaptively enabling a copy mode and a Swap Mode, according to one embodiment.

The following definitions are provided as they are typically (but not exclusively) used in a storage system, implementing the various adaptive embodiments described herein.

"Copy Mode" (or copy mode) means a mode for executing a replication operation, during which information from a storage volume (includes both logical and physical storage volumes) is first loaded in a memory buffer and then copied to a "stolen buffer". An application (for example, a volume snap mirror application (VSM) managing the information replication operation then accesses the information from the stolen buffer and replicates the information at another location.

"Memory Buffer" means a storage location (includes both logical and physical) that is typically used to temporarily store information. In a storage server environment, the operating system manages a plurality of memory buffers for storing information received from a storage volume.

"Snapshot" means a point in time copy of a storage file system. The snapshot is a persistent point in time (PPT) image of the active file system that enables quick recovery of data after data has been corrupted, lost, or altered. Snapshots can be created by copying the data at each predetermined point in time to form a consistent image, or virtually by using a pointer to form the image of the data.

"Stolen Buffer" means a memory buffer that is assigned to an application (for example, VSM). Typically, an operating system for a storage system manages a plurality of memory buffers. Upon receiving a request from the application, the operating system assigns (or allocates) one or more of the plurality of memory buffers to the application. The allocated buffers are then no longer available for use by another application or entity, including the operating system, and hence are considered "stolen".

As used in this disclosure, the terms "component" "module", "system," and the like are intended to refer to a computer-related entity, either software, hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other device, in accordance with the claimed subject matter.

It is noteworthy that the term "file" as used throughout this specification includes a container, an object or any other storage entity.

Process Flow:

FIG. 1 shows a process flow diagram for adaptive copying/swapping during a replication process, according to one embodiment. The process starts in step S100, when an input/output (I/O) request is generated to replicate information from a source volume. The request may come from a client application (See 326, FIG. 3D).

In step S102, an application (for example, VSM, 304, FIG. 3A) determines if there is information to be transferred. If no information needs to be transferred, then the process ends in step S104.

If information is to be transferred, then in step S106, VSM determines the number of blocks that need to be sent. VSM creates a message for the operating system with a request for a chain of buffers. The chain of buffers should have enough capacity to accommodate the number of blocks that are transferred from the source volume. The chain of buffers is referred to herein as the stolen buffers.

In step S108, VSM determines if another transfer from the same storage source volume is pending or active. If yes, then in step S110, the Copy Mode is enabled for all transfers from the same source volume. After the Copy Mode is enabled, the process moves to step S116 that is described below.

During the Copy Mode, information from the source volume is loaded to a memory buffer and then copied to a stolen buffer. The Copy Mode is used for all the pending/active requests from the same source storage volume. It is advantageous to selectively use the Copy Mode because data that is cached for a first transfer request may be used for a second transfer request. Furthermore, if the second transfer operation gets ahead of the first transfer operation, then the first transfer operation can take advantage of the second transfer operation.

If a transfer from the same source storage volume is not active in step S108, then VSM enables a Swap Mode (may also be referred to as swap mode) in step S112. The Swap Mode is described below in detail.

In step S114, VSM determines if the Swap Mode is enabled for the source volume. If the Swap Mode is not enabled, then in step S116, VSM indicates that in the message that it sends to the operating system. This indicates to a file system manager of the operating system that information from the source volume is to be copied to a stolen buffer from a memory buffer (i.e. using the Copy Mode), rather than swapping a pointer, as described below.

If the Swap Mode is enabled for the source volume, then in step S118, VSM determines if another competing process will conflict with the Swap Mode. If there is no conflict with another process, then the message is marked for swapping. Thereafter, in step S120, the message is sent to the operating system that processes the message, as described below in detail.

A competing process, as referred above with respect to step S118, includes any process or application whose performance may be negatively impacted by using the swap mode. For example, an application (not shown) for optimizing write requests processing in a storage system may be considered to be one such process. If the swap mode is used, while the application is active, then execution of this application may be negatively impacted i.e. write requests may not be optimally processed. It is noteworthy that the intent of step S118 is not just to evaluate the negative impact of using the swap mode on any single application, but instead is an intelligent check to reduce the overall negative impact, if any, of using the swap mode.

Figure 2:
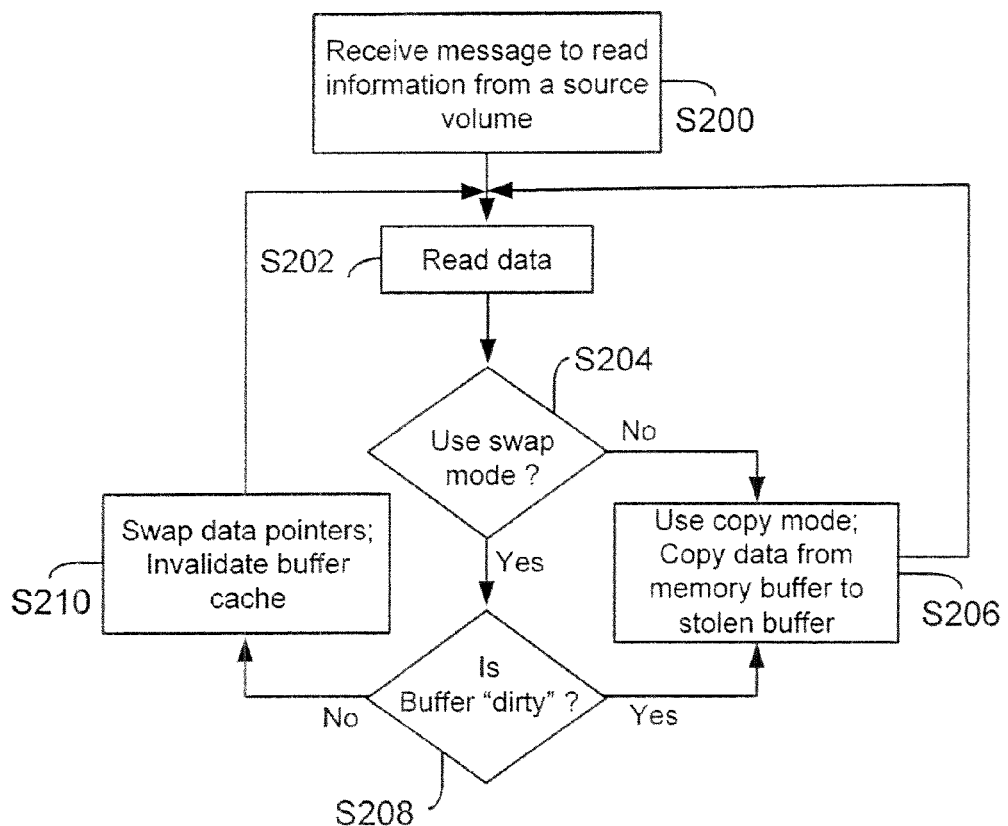
FIG. 2 shows a process diagram for executing the Copy Mode and the Swap Mode, according to one embodiment.

FIG. 2 describes the process flow diagram for handling messages from VSM, according to one embodiment. The process starts in step S200, when the operating system (for example, the file system manager of the operating system) receives a message from the VSM to read data from a storage volume. In step S202, the file system manager of the operating system reads information from the storage volume and loads it to one or more memory buffers.

In step S204, the file system manager determines if information is to be sent using the Swap Mode, described below in detail. If the Swap Mode is not used, then in step S206, the Copy Mode is used. During the Copy Mode, information is copied from one or more memory buffer to one or more stolen buffers, after the information has been loaded from the storage volume to one or more memory buffers.

If the Swap Mode is enabled, then in step S208, the file system manager determines if the memory buffer is "dirty". A buffer is considered to be dirty, if some action has been taken to write information to a buffer, even though the buffer may not actually have been written to disk/storage volume. If the buffer is dirty, then the information is copied, similar to step S206.

If the buffer is not dirty, then in step S210, the file system manager swaps data pointers, such that a header in a stolen buffer points to data stored in the memory buffer. This allows the VSM to access information stored in the memory buffer while still using the stolen buffer. The file system manager also invalidates the memory buffer so that another application, the operating system or any other entity may not attempt to access the memory buffer. The invalidation and pointer swap is discussed below with respect to FIG. 3C.

Figure 3A:
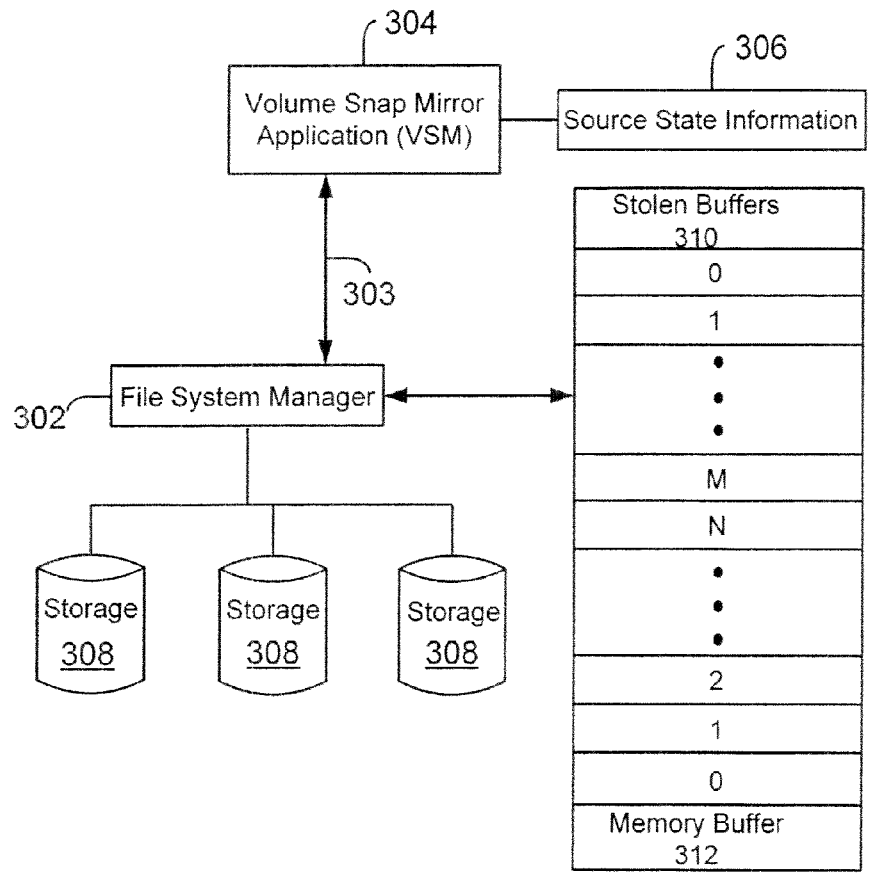
FIG. 3A shows a block diagram of a system using the methodology of the present disclosure.

System:

FIG. 3A shows an example of a generic system 300 that may be used for executing the foregoing process steps. System 300 includes a file system manager 302 (also referred to as file system 302) of an operating system (348, FIG. 3E) that can access a plurality of storage volumes 308. VSM 304 interfaces with file system manager 302 to replicate storage volume 308. File system manager 302 manages and controls memory 312 to load information from storage volume 308 to memory buffers O-N. File system manager 302 maintains a list that indicates which of the memory buffers 0 to N are valid for use. In one embodiment, a register bit value (not shown) may be used to indicate a valid or an invalid memory buffer 0 to N.

Memory 312 also includes stolen buffers 0 to M (collectively shown as 310) that are assigned to VSM 304 by file system manager 302. After the stolen buffers 310 are assigned to VSM 304, they are not available for use by another application including the operating system.

Figure 3B:
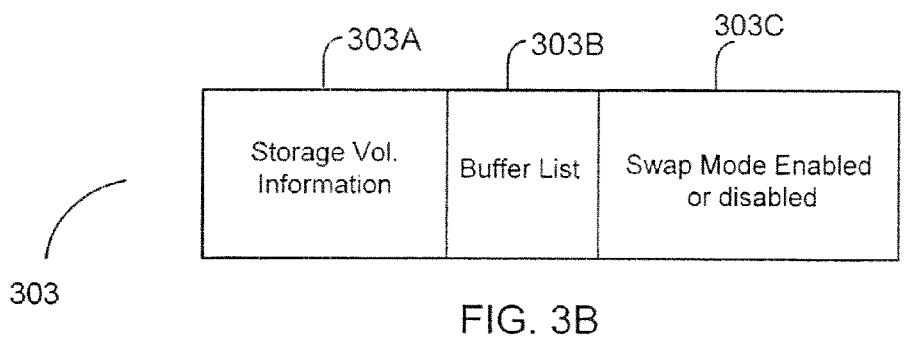
FIG. 3B shows an example of a message used by an application to enable the Swap Mode and the Copy Mode, according to one embodiment.

To replicate storage volume 308, VSM 304 sends a message 303 to file system manager 302. An example of message 303 is shown in FIG. 3B. Message 303 includes storage volume information 303A and a buffer list 303B. The storage volume information 303A includes information regarding storage volume 308 for file system manager 302.

The buffer list 303B is a list of one or more pre-allocated stolen buffers 310. Each stolen buffer header has a volume block number whose data is read into the stolen buffer.

Message 303 also includes a Swap Mode indicator 303C, which indicates to the file system manager 302, whether information from the memory buffer is to be moved in a Swap Mode or a Copy Mode. If indicator 303C is set to enable the Swap Mode, then storage volume 308 information is not copied from a memory buffer 312 to a stolen buffer 310. Instead, data pointers are swapped such that information is accessed by VSM 304 directly from memory buffer 312 while still using the stolen buffer.

It is noteworthy that although message 303, as an example, is shown in contiguous blocks, the adaptive embodiments are not limited to any particular structure or format of message 303. For example, the various fields in message 303 may be split in more than one message and/or more than one message type.

Figure 3C:
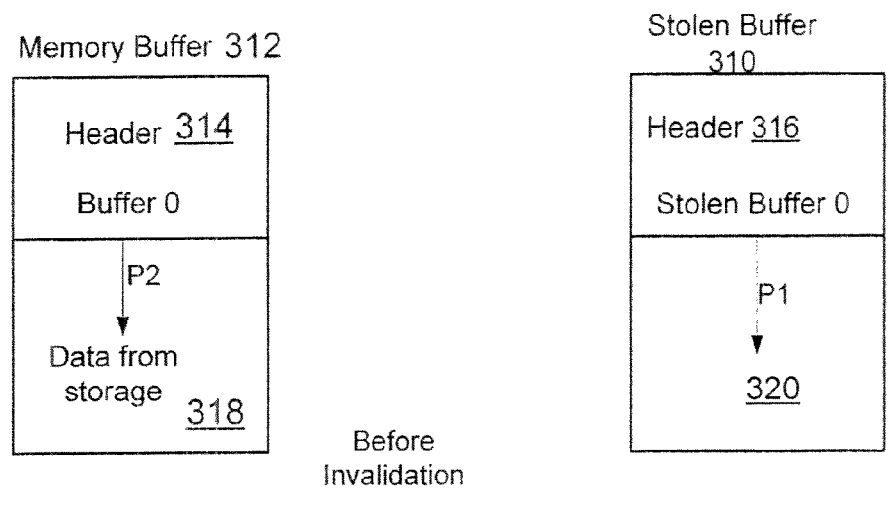
FIG. 3C shows an example of how pointers are swapped during a Swap Mode.
Figure 3C:
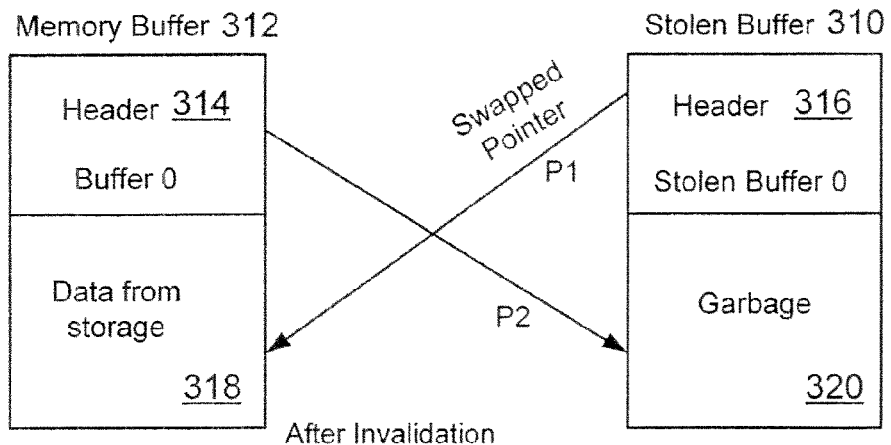

FIG. 3C shows how pointers are swapped during the Swap Mode and a memory buffer is invalidated, according to one embodiment. For illustration sake, Memory Buffer 0 (one of the memory buffers 312) stores a header 314 and data 318. Header 314 includes information regarding the stored data 318 that is loaded from a storage volume (for example, 308). Stolen buffer 0 (from stolen buffers 312) may also include a header 316.

Before invalidation and pointer swap, a pointer P1 from stolen buffer header 316 points to any information that may be stored at stolen buffer. Pointer P2 from memory buffer header 314 points to information 318 loaded from a storage volume.

To implement the Swap Mode, pointer P1 and P2 are swapped as shown in the "After Invalidation" portion of FIG. 3C. Memory Buffer 0 is invalidated so that no other entity can access it. In one embodiment, a register bit (not shown) may be set to invalidate Memory Buffer 0.

In the Swap Mode, VSM 304 can read data 318 directly from Memory Buffer 0, while still using header 316 for stolen buffer 310 because pointer P1 points to data 318 stored in Memory Buffer 0. This is different from a conventional system, where data 318 would first be copied to stolen buffer 0 (310) and then read from stolen buffer 0 (for example, using pointer P1 in the "Before Invalidation" segment of FIG. 3C).

In one embodiment, swapping pointers P1 and P2 and then VSM using pointer P1 to access data 318, saves processing time, because data does not have to be copied from a memory buffer (312) to a stolen buffer (310).

After the pointers are swapped, if any entity uses header 314, then pointer P2 directs the entity to segment 320, which does not store any meaningful information (shown as "garbage"). In one embodiment, use of pointer P2 may generate an error.

Figure 3D:
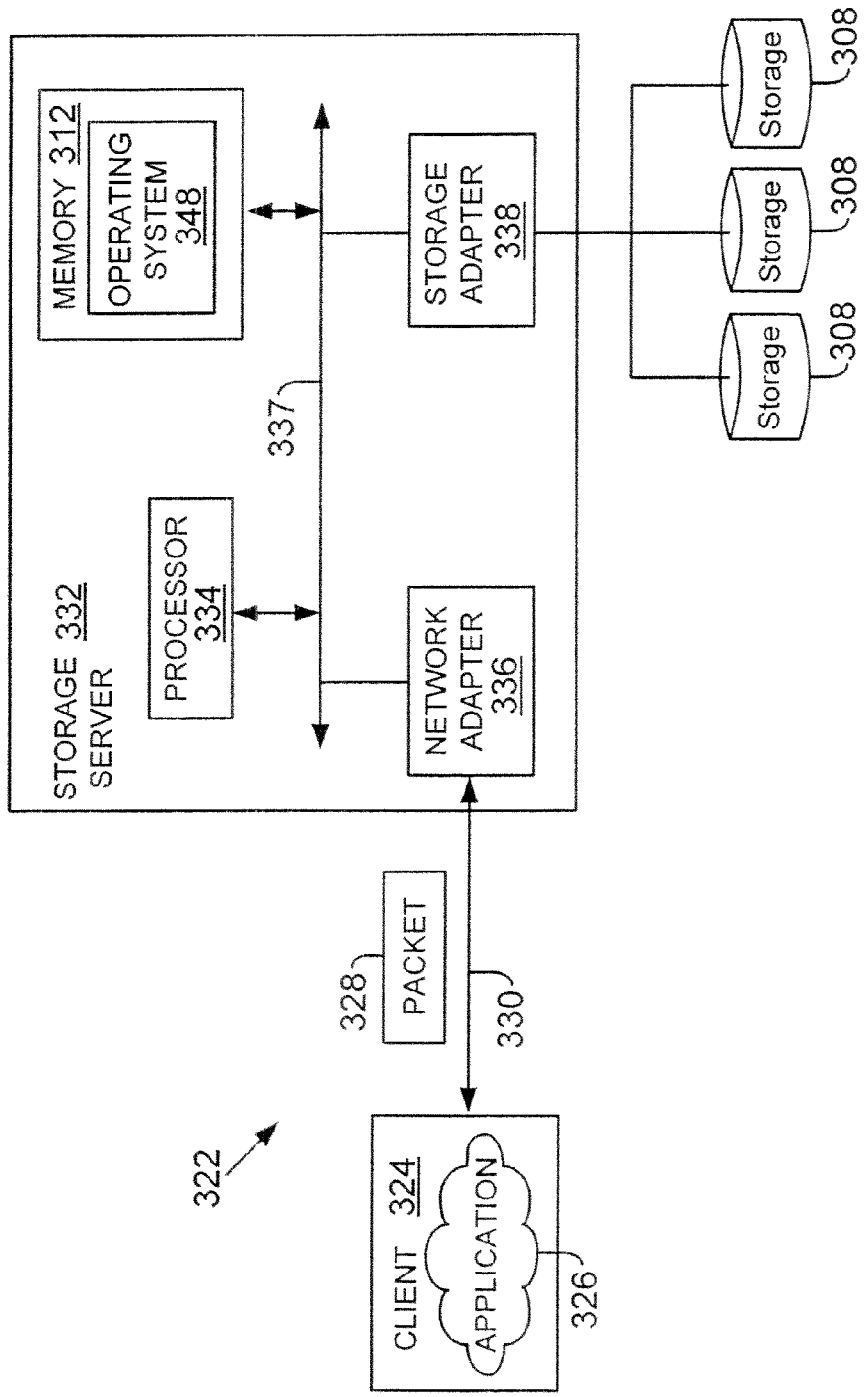
FIG. 3D shows an example of a storage system used for implementing the process steps according to one embodiment.

FIG. 3D is a schematic block diagram of a system 322 including a storage server 332 that may be advantageously used with the various embodiments disclosed herein. The storage server (network storage appliance or storage system) 332 is a special-purpose computing system that provides various services relating to the organization of information on storage devices 308 (may also be referred to as disks 308), which includes any type of storage device; including non-volatile memory devices (flash memory). However, it will be understood to those skilled in the art that the inventive embodiments described herein may apply to any type of special-purpose (e.g., server) or general-purpose computer, including a standalone computer.

It is noteworthy that the storage server, the processes and systems disclosed herein are not limited to processing file based access requests. The adaptive embodiments disclosed herein can support block based storage requests, for example, Small Computer Systems Interface (SCSI) based requests.

Storage server 332 comprises a processor 334, memory 312, a network adapter 336 and a storage adapter 338 interconnected by a bus 337. The storage server 332 also includes operating system 348 described below with respect to FIG. 3E that implements the file system manager 302 to logically organize the information as a hierarchical structure of directories and files on disks 308.

In the illustrative embodiment, memory 312 may include storage locations that are addressable by processor 334 and adapters (336 and 338) for storing software program code and data structures associated with the embodiments of the present disclosure. The processor 334 and adapters (336 and 338) may, in turn, comprise processing elements and/or logic circuitry configured to execute the software code and manipulate the data structures.

The operating system 348, portions of which is typically resident in memory 312 and executed by the processing elements, functionally organizes storage server 332 by, inter alia, invoking storage operations in support of a file service implemented by storage server 332. It will be apparent to those skilled in the art that other processing and memory means, including various computer readable media, may be used for storing and executing program instructions pertaining to the embodiments described herein.

Network adapter 336 comprises the mechanical, electrical and signaling circuitry needed to connect storage server 332 to a client 324 over a computer network 330, which may comprise a point-to-point connection or a shared medium, such as a local area network. The client 324 may be a general-purpose computer configured to execute applications including file system protocols, such as the Common Internet File System (CIFS) protocol. Moreover, the client 324 may interact with the storage server 332 in accordance with a client/server model of information delivery. That is, the client may request the services of the storage server, and the storage server may return the results of the services requested by the client, by exchanging packets 328 encapsulating, e.g., the CIFS protocol format (or a block based format, e.g. the SCSI format) over the network 330. The format of the CIFS protocol packet exchanged over the network is well known and described in Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein. The block based SCSI format is also well known and is incorporated herein by reference in its entirety.

Storage adapter 338 cooperates with operating system 348 to access information requested by a client application (326). The information may be stored in disks 308. The storage adapter includes input/output (I/O) interface circuitry that couples to disks 308 over an I/O interconnect arrangement, such as a conventional high-performance, Fibre Channel serial link topology. The information is retrieved by storage adapter 338 and, if necessary, processed by processor 334 (or the adapter 338 itself) prior to being forwarded over system bus 337 to network adapter 336, where the information is formatted into a packet and returned to client 324.

To facilitate access to disks 308, operating system 348 implements a file system that logically organizes the information as a hierarchical structure of directories and files on the disks. Each "on-disk" file may be implemented as set of disk blocks configured to store information, such as text, whereas a directory may be implemented as a specially formatted file in which other files and directories are stored. An example of operating system 348 is Data ONTAP™ operating system available from Network Appliance, Inc. that implements a Write Anywhere File Layout (WAFL) file system.

In one embodiment, system 322 may have a distributed architecture. For example, system 322 may include a storage server that can be implemented with multiple distributed storage servers. It can also include a physically separate network module (e.g., "N-module") and disk module (e.g., "D-module") (not shown), which communicate with other storage servers over an external interconnect. The N-module acts as a front-end of the storage server, exporting services to clients; and the D-module acts as the back-end, managing the underlying storage of the storage server. The N-module and D-module can be contained in separate housings and communicate with each other via network connections. Thus, the N-module and the D-module enable a storage server to be physically separated into multiple modules that can be distributed across a network.

Figure 3E:
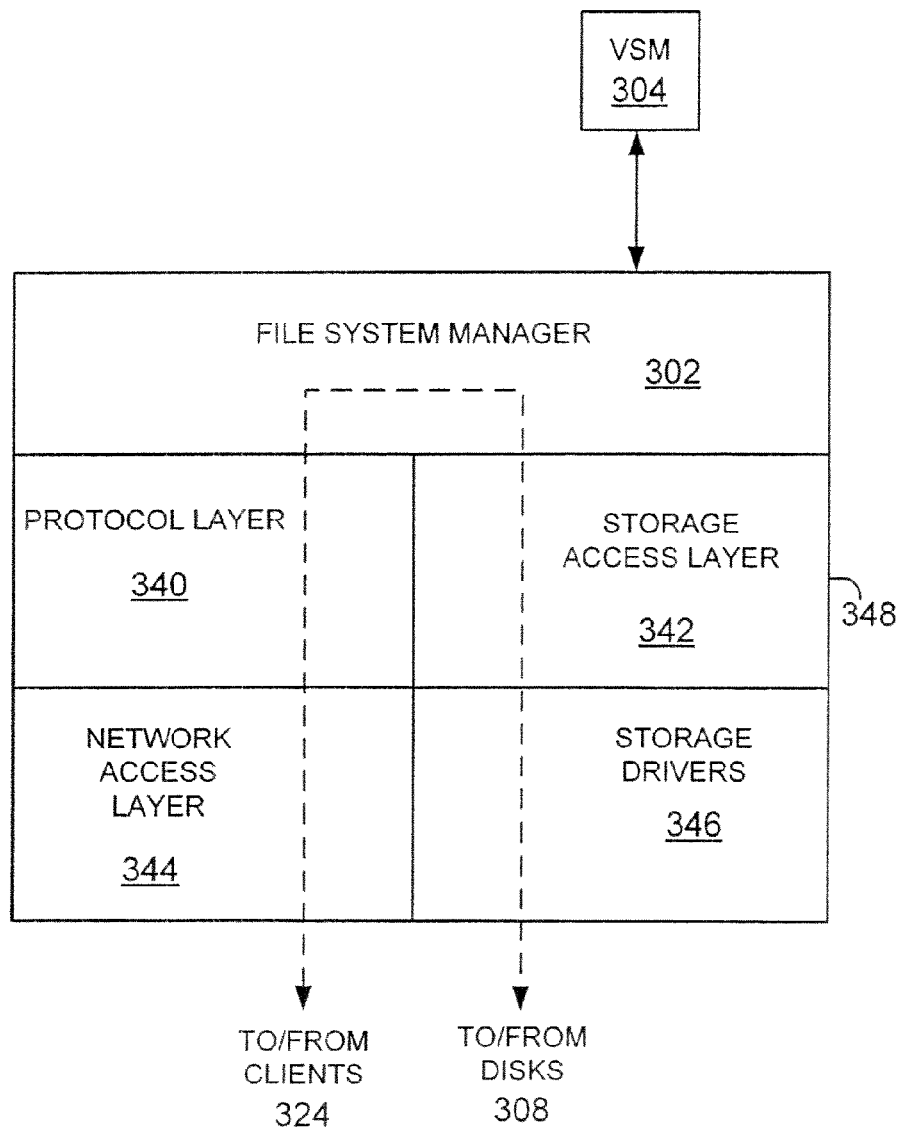
FIG. 3E shows an example of an operating system used by a storage system of FIG. 3D, according to one embodiment.

Operating System Architecture:

FIG. 3E illustrates a generic example of operating system 348 for storage server 332, according to one embodiment of the present disclosure. In one example, operating system 348 may be installed on storage server 332. It is noteworthy that operating system 348 may be used in any desired environment and incorporates any one or more of the features described herein.

In one example, operating system 348 may include several modules, or "layers." These layers include the file system manager 302 that keeps track of a directory structure (hierarchy) of the data stored in a storage subsystem and manages read/write operations, i.e. executes read/write operations on disks in response to client 324 requests.

Operating system 348 may also include a protocol layer 340 and an associated network access layer 344, to allow storage server 332 to communicate over a network with other systems, such as clients 324. Protocol layer 340 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 344 may include one or more drivers, which implement one or more lower-level protocols to communicate over the network, such as Ethernet. Interactions between clients 324 and mass storage devices 308 (e.g. disks, etc.) are illustrated schematically as a path, which illustrates the flow of data through operating system 348.

The operating system 348 may also include a storage access layer 342 and an associated storage driver layer 346 to allow storage server 332 to communicate with a storage subsystem. The storage access layer 342 may implement a higher-level disk storage protocol, such as RAID (redundant array of inexpensive disks), while the storage driver layer 346 may implement a lower-level storage device access protocol, such as Fibre Channel Protocol (FCP) or SCSI. In one embodiment, the storage access layer 342 may implement a RAID protocol, such as RAID-4 or RAID-DP™ (RAID double parity for data protection provided by Network Appliance, Inc., the assignee of the present disclosure).

It should be noted that the software "path" through the operating system layers described above needed to perform data storage access for the client request received at the storage server may alternatively be implemented in hardware. That is, in an alternate embodiment of the invention, the storage access request data path may be implemented as logic circuitry embodied within a field programmable gate array (FPGA) or an application specific integrated circuit (ASIC). This type of hardware implementation increases the performance of the file service provided by storage server 332 in response to a file system request packet 328 issued by client 324. Moreover, in another alternate embodiment of the invention, the processing elements of network and storage adapters (336, 338) may be configured to offload some or all of the packet processing and storage access operations, respectively, from processor 334 to thereby increase the performance of the file service provided by the storage server.

In one embodiment, file system manager 302 includes a write anywhere file system layer (WAFL) layer. The WAFL based file system is block-based, i.e. stores information on disks as blocks, for example, using, e.g., 4 kilobyte (KB) data blocks, and using inodes to describe the files. An inode is a data structure, which may be used to store information, such as meta-data, about a file. The meta-data may include data information, e.g., ownership of the file, access permission for the file, size of the file, file type and location of the file on disk, as described below. The WAFL layer uses a file handle, i.e., an identifier that includes an inode number, to retrieve an inode from a storage disk. The WAFL layer also uses files to store meta-data describing the layout of its file system. These meta-data files include, among others, an inode file.

The present disclosure provides an adaptable process that allows one to copy information from a memory buffer to a stolen buffer or swap pointers, depending on the operating environment, at any given time. The process is flexible and reduces the overall workload for storage server processor.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method for replicating information from a source storage volume to another storage volume, comprising:

generating a transfer request for replicating information stored at the source storage volume;

determining a transfer size for replicating the information in response to the transfer request and assigning at least one memory buffer front among a plurality of memory buffers for storing the information during a copy mode before the information is transferred, wherein an operating system of a storage system assigns the at least one memory buffer exclusively to an application that determines the transfer size and interfaces with the operating system for replicating the information from the source storage volume;

determining by the application if another request to transfer information from the same source storage volume is already active;

the application notifying the operating system to use a swap mode for transferring information stored at the source storage volume when another request to transfer the information from the same source storage volume is not active and there is no conflict with another process using the source storage volume, wherein, during the swap mode, the information is loaded from a storage device associated with the source storage volume to one of the memory buffers different from the at least one buffer assigned exclusively to the application and then access to the information is provided to the application requesting the information replication without copying the information from one of the memory buffers different from the at least one buffer assigned exclusively to the application to the at least one memory buffer assigned exclusively to the application; and the application notifying the operating system to use the copy mode for transferring information stored at the source storage volume when another request to transfer the information from the same source storage volume is already active, wherein, during the copy mode, the information is first loaded from the storage device associated with the source storage volume to one of the plurality of memory buffers different from the at least one buffer assigned exclusively to the application and then copied to the exclusively assigned memory buffer so that the application can access the copied information from the exclusively assigned memory buffer.

2. The method of claim 1, wherein the swap mode for transferring information is not enabled, if another process is negatively impacted.

3. The method of claim 1, wherein the application creates a message; enables the swap mode in the created message and passes the message to the operating system.

4. The method of claim 3, wherein the operating system reads the message from the application and the swap mode is used for transferring information to the application.

5. The method of claim 4, wherein for executing the swap mode, the operating system swaps data pointers so that information stored in one of the plurality of memory buffers is accessible to the application without having to copy the information to the assigned buffer.

6. The method of claim 5, wherein after the data pointers are swapped, to prevent access to the memory buffer, the operating system invalidates the memory buffer.

7. The method of claim 1, wherein the application creates a message for the operating system and enables the copy mode in the created message to transfer the information in the copy mode.

8. A method for replicating information from a source storage volume to another storage volume, comprising:

generating a transfer request from a client computing system for replicating information stored at the source storage volume;

determining a transfer size for replicating the information in response to the transfer request and assigning at least one memory buffer from among a plurality of memory buffers for storing the information only during a copy mode, before the information is transferred, wherein an operating system of a storage system assigns the at least one memory buffer exclusively to an application that determines the transfer size and interfaces with the operating system for replicating the information from the source storage volume;

determining by the application if another request to transfer information from the same source storage volume is already active;

enabling a swap mode for transferring information stored at the source storage volume when another request to transfer the information from the same source storage volume is not active and there is no conflict with another process using the source storage volume, wherein the application creates a message, enables the swap mode in the created message, passes the message to the operating system that reads the message to use the swap mode for transferring information from the source storage volume, and, during the swap mode, the information is loaded from a storage device associated with the source storage volume to one of the memory buffers different from the at least one buffer assigned exclusively to the application and then access to the information is provided to the application requesting the information replication without copying the information to the buffer assigned exclusively to the application;

enabling the copy mode for transferring information stored at the source storage volume when another request to transfer the information from the same source storage volume is already active or there is no conflict with another process using the source storage volume, wherein, during the copy mode, the information from the source storage volume is first loaded from the storage device associated with the source storage volume to one of the plurality of memory buffers different from the at least one buffer assigned exclusively to the application and then copied to the exclusively assigned memory buffer so that the application can access the copied information from the exclusively assigned memory buffer.

9. The method of claim 8, wherein for executing the swap mode, the operating system swaps data pointers so that information stored in one of the plurality of memory buffers is accessible to the application without having to copy the information to the assigned buffer.

10. The method of claim 9, wherein after the data pointers are swapped, to prevent access to the memory buffer, the operating system invalidates the memory buffer.

11. The method of claim 8, wherein the application creates a message for the operating system and enables the copy mode in the created message to transfer the information in the copy mode.

12. A method for replicating information from a source storage volume to another storage volume, comprising:
   generating a transfer request for replicating information stored at the source storage volume;
   determining a transfer size for replicating the information in response to the transfer request and assigning at least one memory buffer from among a plurality of memory buffers for storing information only during a copy mode, before the information is replicated, wherein an operating system of a storage system assigns the at least one memory buffer exclusively to an application that determines the transfer size and interfaces with the operating system for replicating the information from the source storage volume;
   determining by the application if another request to transfer information from the same source storage volume is already active;
   enabling a swap mode for transferring information stored at the source storage volume when another request to transfer the information from the same source storage volume is not active and there is no conflict with another process using the source storage volume,
       wherein the application creates a message enables the swap mode in the created message and passes the message to the operating system, and, during the swap mode, the operating system swaps data pointers so that information stored in one of the plurality of memory buffers different from the at least one buffer assigned exclusively to the application is accessible to the application without having to copy the information to the exclusively assigned memory buffer, and after the data pointers are swapped, to prevent access to the exclusively assigned memory buffer, the operating system invalidates the exclusively assigned memory buffer; and
   enabling the copy mode for transferring information stored at the source storage volume when another request to transfer the information from the same source storage volume is already active or there is conflict with another process using the source storage volume,
       wherein, during the copy mode, the information is first loaded from the source storage volume to one of the plurality of memory buffers different from the at least one buffer assigned exclusively to the application and then copied to the exclusively assigned memory buffer so that the application can access the copied information from the exclusively assigned memory buffer.

13. The method of claim 12, wherein the swap mode for transferring information is not set by the application, if another process is negatively impacted if the swap mode is executed.

14. A computer program product comprising a non-transitory machine readable storage medium having computer readable code embodied therein for replicating information stored at a source storage volume to another storage volume, said computer readable code includes:
   code for generating a transfer request for replicating information stored at the source storage volume;
   code for determining a transfer size for replicating information in response to the transfer request and assigning at least one memory buffer from among a plurality of memory buffers for storing information during a copy mode, before the information is transferred, wherein an operating system of a storage system assigns the at least one memory buffer exclusively to an application that determines the transfer size and interfaces with the operating system for replicating the information from the source storage volume;
   code for determining by the application if another request to transfer information from the same source storage volume is already active;
   code for the application notifying the operating system to use a swap mode for transferring information stored at the source storage volume when another request to transfer the information from the same source storage volume is not active and there is no conflict with another process using the source storage volume, wherein, during the swap mode, the information is loaded from a storage device associated with the source storage volume to one of the memory buffers different from the at least one buffer assigned exclusively to the application and then access to the information is provided to the application requesting the information replication without copying the information from one of the memory buffers different from the at least one buffer assigned exclusively to the application to the at least one memory buffer assigned exclusively to the application; and
   code for the application notifying the operating system to use the copy mode for transferring information stored at the source storage volume when another request to transfer the information from the same source storage volume is already active, wherein, during the copy mode, the information is first loaded from the storage device associated with the source storage volume to one of the plurality of memory buffers different from the at least one buffer assigned exclusively to the application and then copied to the exclusively assigned memory buffer so that the application can access the copied information from the exclusively assigned memory buffer.

15. The computer program product of claim 14, wherein for executing the swap mode, the operating system swaps data pointers so that information stored in one of the plurality of memory buffers, is accessible to the application without having to copy the information to the assigned buffer.

16. The computer program product of claim 15, wherein after the data pointers are swapped, to prevent access to the memory buffer, the operating system invalidates the memory buffer.

17. A system for replicating information from a source storage volume at a storage system to another storage volume, comprising:

a processor; and a memory, wherein the memory is configured with modules stored thereon, the modules comprising;

a processor executable application that requests at least one memory buffer from among a plurality of memory buffers, wherein an operating system of the storage system assigns the at least one memory buffer exclusively to the application;

notifies the operating system to use a swap mode for transferring information stored at the source storage volume when another request to transfer the information from the source storage volume is not active and there is no conflict with another process using the source storage volume, wherein, during the swap mode, the information is loaded to one of the memory buffers different from the at least one buffer assigned exclusively to the application from a storage device associated with the source storage volume and then access to the information is provided to the application requesting the information replication without copying the information to the at least one memory buffer assigned exclusively to the application; and notifies the operating system to use a copy mode for transferring information stored at the source storage volume when another request to transfer information from the source storage volume is already active or there is conflict with another process using the source storage volume, wherein, during the copy mode, the information is first loaded from the storage device associated with the source storage volume to one of the plurality of memory buffers different from the at least one buffer assigned exclusively to the application and then copied to the exclusively assigned memory buffer so that the application can access the copied information from the exclusively assigned memory buffer.

18. The system of claim 17, wherein for executing the swap mode, the operating system swaps data pointers so that information stored in one of the plurality of memory buffers, is accessible to the application without having to copy the information to the assigned buffer.

19. The system of claim 18, wherein after the data pointers are swapped, to prevent access to the memory buffer, the operating system invalidates the memory buffer.

20. A method for replicating information from a source storage volume to another storage volume, comprising:

generating a transfer request from a client computing system for replicating information stored at the source storage volume;

assigning at least one memory buffer exclusively to an application from among a plurality of memory buffers managed by a storage operating system, wherein the application determines a transfer size for replicating information in response to the transfer request and the exclusively assigned buffer is used to store the information during a copy mode;

selectively enabling a swap mode and the copy mode for replicating the information from the source storage volume, wherein, during the swap mode that is enabled when another request to transfer the information from the same source storage volume is not active and there is no conflict with another process using the source storage volume, the information is loaded from a storage device to one of the plurality of memory buffers different from the at least one buffer assigned exclusively to the application and then access to the information is provided to the application requesting the information replication without copying the information to the at least one memory buffer assigned exclusively to the application, and wherein, during the copy mode, the information is first loaded from the storage device associated with the source storage volume to one of the plurality of memory buffers different from the at least one buffer assigned exclusively to the application and then copied to the exclusively assigned memory buffer so that the application can access the copied information from the exclusively assigned memory buffer.

21. The method of claim 20, wherein the copy mode is used when another request to transfer information from the source storage volume is already active.

22. The method of claim 20, wherein the application creates a message; enables the swap mode in the created message and passes the message to an operating system.

23. The method of claim 20, wherein for executing the swap mode, an operating system swaps data pointers so that information stored in one of the plurality of memory buffers is accessible to the application without having to copy the information to the assigned buffer.

24. The method of claim 23, wherein after the data pointers are swapped, to prevent access to the memory buffer, the operating system invalidates the memory buffer.

25. A method for replicating information from a source storage volume to another storage volume, comprising:

assigning at least one memory buffer from among a plurality of memory buffers managed by a storage operating system exclusively to an application that determines a transfer size for replicating information in response to a transfer request from a computing system; and selectively enabling a first mode for replicating the information from the source storage volume to the another volume when another request to transfer the information from the same source storage volume is not active and there is no conflict with another process using the source storage volume, wherein, during the first mode, the information is loaded from a storage device to one of the plurality of memory buffers different from the at least one buffer assigned exclusively to the application and then access to the information is provided to the application requesting the information replication without copying the information to the at least one memory buffer assigned exclusively to the application.

26. The method of claim 25, wherein when another request to transfer the information from the same source storage volume is active, then a second mode is used to replicate the information, during which, the information is first loaded from the storage device associated with the source storage volume to one of the plurality of memory buffers and then copied to the assigned memory buffer.

27. The method of claim 25, wherein for executing the first mode, the storage operating system swaps data pointers so that the information stored in one of the plurality of memory buffers is accessible to the application without having to copy the information to the assigned buffer.

* * * * *